E. G. CLYMANS & A. M. HESS.
GRAIN SEPARATOR.
APPLICATION FILED OCT. 26, 1909.
990,804.
Patented Apr. 25, 1911.
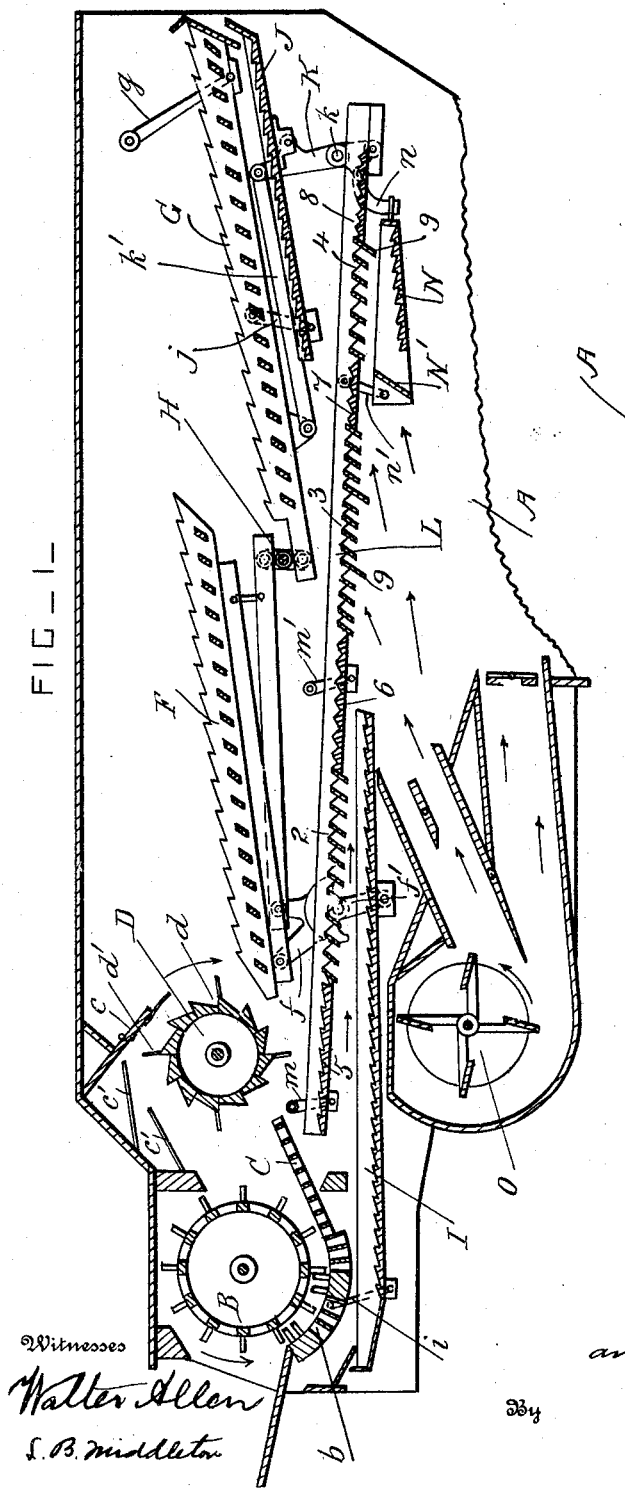
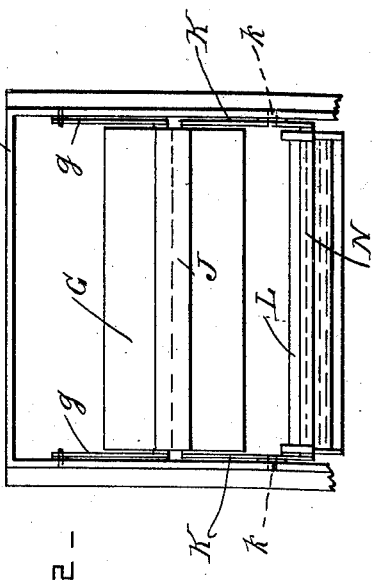
Witnesses
Walter Allen
S. B. Middleton
Inventors
Ezra G. Clymans,
and Andrew M. Hess.
By Herbert W. T. Jenner.
Attorney

UNITED STATES PATENT OFFICE.

EZRA G. CLYMANS AND ANDREW M. HESS, OF WAYNESBORO, PENNSYLVANIA, ASSIGNORS TO THE GEISER MANUFACTURING COMPANY, OF WAYNESBORO, PENNSYLVANIA.

GRAIN-SEPARATOR.

990,804.     Specification of Letters Patent.     Patented Apr. 25, 1911.

Application filed October 26, 1909. Serial No. 524,662.

*To all whom it may concern:*

Be it known that we, EZRA G. CLYMANS and ANDREW M. HESS, citizens of the United States, residing at Waynesboro, in the county of Franklin and State of Pennsylvania, have invented certain new and useful Improvements in Grain-Separators; and we do hereby declare the following to be a full, clear, and exact description of the invention, such as will enable others skilled in the art to which it appertains to make and use the same.

This invention relates to the mechanism used for separating the short straw and chaff from the grain, in a threshing machine; and it consists in the novel construction and combination of the parts hereinafter fully described and claimed whereby short straw is prevented from falling into the grain-bottom and whereby a better separation is assured.

In the drawings, Figure 1 is a longitudinal section through the upper portion of a grain separator showing the novel devices. Fig. 2 is an end view of the separating mechanism taken from the rear.

A is a portion of the casing of a grain separator provided at its front end with a threshing-cylinder B and a concave b.

C is an upwardly and rearwardly inclined grate at the rear end of the concave. These parts are of any approved construction.

D is a revoluble grain-separating drum journaled behind the threshing-cylinder, and provided with grain pockets d and radial teeth d'. A deflector c is arranged over the top and rear part of the drum D, and deflecting fingers c' are arranged over its front and top part. These parts are more fully shown and described in the patent to E. G. Clymans, dated July 20, 1909, No. 928,498. The direction of motion of the various revoluble parts is indicated by curved arrows in the drawings.

F is the front straw-shaker, and G is the rear straw-shaker which are arranged longitudinally in the casing behind the drum D.

H is a revoluble crank-shaft journaled in the casing and arranged to support the adjacent ends of the shakers F and G, and to give them and the various parts connected to them a reciprocating and tossing motion. The front end of the shaker F is carried by two similar arms f which are pivoted to the frame. The rear end of the shaker G is carried by two similar arms g which are pivoted to the frame.

I is the grain-bottom which extends under the threshing mechanism, the grain-separating grate C, the drum D, and the major portion of the front shaker F. The front end of the grain-bottom I is supported by two similar rods i which are pivoted in the casing. The rear end of the grain-bottom I is connected to two similar arms f' which are extensions of the arms f.

J is a return bottom for grain arranged under the middle and rear end portions of the rear straw-shaker G. The front end of the bottom J is supported by two similar arms j which are pivoted in the casing. The rear end of the bottom J is carried by two similar levers K having pivots k at their middle parts, which pivots are mounted in the frame A. The levers K are driven by two similar connecting-rods k' pivoted to their upper ends and pivotally connected with the rear shaker G.

In order to catch the chaff, short straw and other similar matter which falls from the grain-separating drum D and from the straw-shakers F and G, a long chaffer L is provided. The front end of the chaffer L is arranged under the rear end of the grain-separating grate C, and it extends under the grain-separating drum D and the two straw-shakers. The rear end of the chaffer L is pivoted to the lower parts of the levers K. The front end of the chaffer is carried by two similar arms m, and its middle part is carried by two similar arms m'. The arms m and m' are pivoted to the casing A, and they permit the chaffer to be reciprocated longitudinally by the levers K.

N is a return bottom for grain arranged under the rear end portion of the chaffer. The rear end of this bottom N has two similar arms n which are pivoted to lugs on the lower end portions of the levers K; and its front end portion is carried by two similar links n' which are pivoted in the casing. The front end portion of the bottom N is provided with an inclined blast-deflector or shield N' which prevents the grain from being blown rearwardly off its surface.

O is the fan which drives a current of air rearwardly through the casing in the direction of the straight arrows. A current of air also passes over the front end portion of the grain-bottom I, being driven off by the threshing-cylinder.

The chaffer comprises three series of slats 2, 3 and 4, and imperforate surfaces 5, 6, 7 and 8. The imperforate surfaces are all serrated, and they are arranged alternately of the series of slats. The imperforate surface 5 is arranged under the grain-separating drum D; the imperforate surface 6 is arranged over the rear end of the grain-bottom I; the imperforate surface 7 is arranged over the blast-deflector N'; and the imperforate surface 8 is arranged over the rear end of the return bottom N.

The series of slats 2, which comes over the grain-bottom I, has its slats all of the same depth. The series of slats 3 and 4 have slats 9 of greater depth arranged at intervals. These slats 9 project at the lower side of the chaffer below the adjacent slats, and they operate to deflect the blast upward at the points where they are provided. The chaffer L is inclined downwardly and rearwardly, and its middle part is arranged a short distance above the rear end of the grain bottom I so that a shallow and converging air passage is formed for the blast of air driven rearwardly by the cylinder B and which blows the light rubbish out of the grain bottom. The imperforate portion 6 deflects any light grains which are blown upward by the blast of air from the fan O, as they fall from the grain bottom.

Most of the grain and fine chaff leaves the straw at the threshing-cylinder, and passes through the grain-separating grate C; and the straw is thrown upward and passes over the grain-separating drum D onto the straw-shakers. The drum D agitates the straw, and the grain, chaff and short straw fall from it onto the imperforate portion 5 of the chaffer. The motion of the chaffer causes the material on it to travel rearwardly. The grain falls through the series of slats 2 into the grain-bottom and mixes with the grain discharged by the threshing-cylinder through the grate C. The remaining grain is shaken out of the straw by the shakers F and G, and the grain together with the chaff and short straw falls onto the middle and rear parts of the chaffer. The chaff is blown out at the rear end of the machine; and the short straw and other similar matter which is prevented from falling into the grain-bottom I by the chaffer, is worked rearwardly by the slats and serrations of the chaffer and is discharged at the rear end of the machine.

The imperforate surfaces 6, 7 and 8 prevent blast from passing upwardly, and prevent grain from falling through, at the points where they are arranged. The grain passes to the cleaning mechanism from the grain-bottom I, the return bottom N, and the series of slats 3, most of the grain being discharged by the grain-bottom. When the hereinbefore described mechanisms are used the grain delivered to the cleaning devices is more free from short straw than is possible with the various devices heretofore used.

What we claim is:

1. In a grain separator, the combination, with threshing mechanism, and straw separating devices; of a grain bottom for receiving the grain from the threshing mechanism, a downwardly and rearwardly inclined chaffer having its front end portion arranged over the grain bottom and adapted to receive the material which falls from the straw-separating devices, said chaffer having an imperforate middle portion arranged directly over the rear end of the grain bottom and forming with it a shallow air passage and operating as a grain deflector, said chaffer having also series of slats in its end portions, and means for directing a blast of air across the end of the grain bottom and through the slats at the rear part of the chaffer.

2. In a grain-separator, the combination, with threshing mechanism, straw-shaking mechanism, and a revoluble grain-separating device arranged between the said mechanisms; of a grain-bottom extending under the threshing mechanism, the separating device and the front end portion of the shaking mechanism; a chaffer arranged between the grain-bottom and the said separating device and shaking mechanism; and a return bottom for grain arranged under the rear end portion of the chaffer and provided with a blast-deflector at its front end, the said chaffer having imperforate portions arranged at its extreme ends and over the said blast-deflector and the rear end of the first said grain-bottom, and having series of slats between its imperforate portions.

3. In a grain separator, the combination, with threshing mechanism, and straw-separating devices; of a grain bottom for receiving the grain from the threshing mechanism, a downwardly and rearwardly inclined chaffer having its front end portion arranged over the grain bottom and adapted to receive the material which falls from the straw-separating devices, and a return-bottom for grain arranged under the rear end portion of the chaffer and provided with a blast-deflector at its front end, the said chaffer having imperforate portions arranged over the said blast-deflector and the rear end of the first said grain bottom, and having series of slats between its imperforate portions.

In testimony whereof we affix our signatures, in presence of two witnesses.

EZRA G. CLYMANS.
ANDREW M. HESS.

Witnesses:
WM. G. EPPLEY,
WM. W. SHOEMAKER.

Copies of this patent may be obtained for five cents each, by addressing the "Commissioner of Patents, Washington, D. C."